(12) United States Patent
Oelke

(10) Patent No.: US 10,785,300 B2
(45) Date of Patent: Sep. 22, 2020

(54) STORAGE RATE LIMITING FOR INFORMATION HANDLING SYSTEM WITH MULTIPLE STORAGE CONTROLLERS

(71) Applicant: Dell Products L.P., Round Rock, TX (US)

(72) Inventor: Daniel R. Oelke, Elk River, MN (US)

(73) Assignee: Dell Products L.P., Round Rock, TX (US)

( * ) Notice: Subject to any disclaimer, the term of this patent is extended or adjusted under 35 U.S.C. 154(b) by 580 days.

(21) Appl. No.: 15/291,584

(22) Filed: Oct. 12, 2016

(65) Prior Publication Data

US 2018/0103098 A1    Apr. 12, 2018

(51) Int. Cl.
| | |
|---|---|
| G06F 15/16 | (2006.01) |
| H04L 29/08 | (2006.01) |
| H04L 29/06 | (2006.01) |
| G06F 3/06 | (2006.01) |

(52) U.S. Cl.
CPC ........ *H04L 67/1097* (2013.01); *G06F 3/0611* (2013.01); *G06F 3/0635* (2013.01); *G06F 3/0683* (2013.01); *H04L 67/42* (2013.01)

(58) Field of Classification Search
CPC .................................................. H04L 67/1097
USPC ......................................................... 709/213
See application file for complete search history.

(56) References Cited

U.S. PATENT DOCUMENTS

| | | | | |
|---|---|---|---|---|
| 2011/0199899 A1* | 8/2011 | Lemaire | ............... | H04L 47/2416 370/230.1 |
| 2013/0188485 A1* | 7/2013 | Midani | ............... | H04L 67/2804 370/235 |
| 2013/0227111 A1* | 8/2013 | Wright | .................. | G06F 9/5083 709/223 |
| 2013/0297743 A1* | 11/2013 | Eschet | .................... | H04L 65/60 709/219 |
| 2014/0258617 A1* | 9/2014 | Inoue | ...................... | G06F 3/061 711/114 |

(Continued)

OTHER PUBLICATIONS

J. Huang, Tho-Le Ngoc and J. F. Hayes, "Broadband satcom system for multimedia services," Proceedings of ICC/SUPERCOMM '96—International Conference on Communications, Dallas, TX, 1996, pp. 906-910 (Year: 1996).*

(Continued)

*Primary Examiner* — Melvin H Pollack
*Assistant Examiner* — Messeret F Gebre
(74) *Attorney, Agent, or Firm* — Jackson Walker L.L.P.

(57) ABSTRACT

An I/O management method includes determining local target I/O rates for a plurality of storage controllers across which an I/O stream is distributed. The local target I/O rates may reflect a target latency corresponding to a QoS attribute associated with the I/O stream. A cumulative target I/O rate may be determined based on the local target I/O rates. A token bucket rate may be calculated for each applicable storage controller based on the local target I/O rates. The storage controllers may implement token bucket algorithms in accordance with the token bucket rates to enforce the QoS for the I/O stream. The local target I/O rates may be determined periodically based on measured data indicating actual latency and traffic. A queue depth is determined based on the measured values of latency and traffic. The queue depth is then used with the desired value of latency to obtain the target I/O rates.

14 Claims, 4 Drawing Sheets

(56) References Cited

U.S. PATENT DOCUMENTS

| | | | |
|---|---|---|---|
| 2014/0325522 A1* | 10/2014 | Li | G06F 3/061 |
| | | | 718/104 |
| 2015/0169341 A1* | 6/2015 | Gulati | G06F 9/45533 |
| | | | 718/1 |
| 2015/0373017 A1 | 12/2015 | Oelke | |
| 2016/0210059 A1* | 7/2016 | Oelke | G06F 11/3048 |
| 2016/0259569 A1* | 9/2016 | Povzner | G06F 3/0653 |
| 2017/0083247 A1* | 3/2017 | Ashok | G06F 15/17 |
| 2018/0018272 A1* | 1/2018 | Akaike | G06F 3/06 |

OTHER PUBLICATIONS

Zhang, X., Li, P., Wang, Q., & Li, C. A multi-service token bucket algorithm for MAC QoS system in HFC access network, 2008 (Year: 2008).*

Puqi Perry Tang and T. -. C. Tai, "Network traffic characterization using token bucket model," IEEE INFOCOM '99. Conference on Computer Communications. Proceedings. The Future is Now (Cat. No. 99CH36320), New York, NY, USA, 1999. (Year: 1999).*

M. J. C. Buchli, D. De Vleeschauwer, J. Janssen and G. H. Petit, "Policing aggregates of voice traffic with the token bucket algorithm," 2002 IEEE International Conference on Communications. Conference Proceedings. ICC 2002 (Cat. No. 02CH37333), New York, NY, USA, 2002, pp. 2547-2551 (Year: 2002).*

\* cited by examiner

STORAGE RATE LIMITING FOR INFORMATION HANDLING SYSTEM WITH MULTIPLE STORAGE CONTROLLERS

TECHNICAL FIELD

The present disclosure relates to information handling systems that process a significant volume of I/O storage transactions and, more particularly, I/O storage transactions subject to a quality of service or other type of rate limiting parameter.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may encompass one or more host processing systems or, more simply, hosts, sending I/O transactions to a storage subsystem that includes one or more storage controllers, each of which is associated with one or more physical storage devices. Whether measured in terms of bandwidth, e.g., megabytes per second (MBPS) or throughput, e.g., I/O operations per second (IOPS), the rate at which any host can send I/O to the storage subsystem may be intentionally constrained or limited by the storage subsystem. As a non-limiting example, a quality of service (QoS) parameter associated with a particular stream of I/O operations may correspond to a maximum IOPS the storage subsystem permits for the particular stream.

I/O rate limiting may be achieved with any of various techniques sometimes referred to as token bucket algorithms. A token bucket algorithm may refer to a process in which a storage controller periodically increments a counter, referred to as the token counter, in accordance with a particular IOPS, while decrementing the token counter when an I/O operation is processed. If the value of the token counter is less than one (1) or some other threshold value, the storage controller may suspend processing of any new I/O operations until the token counter increases. In this manner, the IOPS may be maintained at or below an applicable threshold.

Monitoring and enforcing any particular I/O rate limit becomes more complicated when the stream of operations to be rate limited is spread across two or more storage controllers. It is generally not practicable to achieve multi-controller rate limiting by communicating I/O transaction messages from the individual storage controllers to a central controller because the overhead associated with the messaging would negate or negatively impact any benefits associated with employing multiple controllers.

SUMMARY

In accordance with the teachings of the present disclosure, disadvantages and problems associated with implementing and enforcing a QoS or another type of rate limiting parameter for an I/O stream that spans two or more storage controllers are reduced or eliminated.

In accordance with embodiments of the present disclosure, a method of managing I/O in an information handling system includes support for enforcing a QoS attribute for an I/O stream that is distributed across two or more storage controllers. The I/O stream may represent I/O operations associated with a particular class of service, I/O operations associated with a particular host process, I/O operations targeting a particular logical volume or to a particular logical volume group comprising two or more user-designated logical volumes, I/O operations sharing another suitable attribute in common, or a combination thereof.

In at least one embodiment, the method includes determining target I/O rates for each of the storage controllers across which the I/O stream is distributed. These individual target I/O rates may be referred to herein as local target I/O rates. The local target I/O rates may be determined in accordance with a target latency corresponding to the QoS attribute associated with the particular I/O stream.

Upon determining the local target I/O rates, a cumulative target I/O rate may be determined based on the local target I/O rates. For example, the cumulative target I/O rate of a particular I/O stream may be determined by adding together each of the local target I/O rates. Once the local target I/O rates and the cumulative target I/O rates are known, local token bucket rates may be calculated for each of the applicable storage controllers. In at least one embodiment, each local token bucket rate is determined in accordance with a local-to-cumulative ratio, i.e., a ratio of the local target I/O rate to the cumulative target I/O rate. For example, a local token bucket rate for a first storage controller may be determined by multiplying the cumulative target I/O rate of the applicable I/O stream by the local-to-cumulative ratio for the first controller.

The information handling system may assign the local token bucket rates to each applicable storage controller, i.e., each storage controller associated with the information stream of interest. Each storage controller may be configured to maintain a token bucket by performing a token bucket algorithm in accordance with the corresponding local token bucket rate. In accordance with the token bucket algorithm, each applicable storage controller performs pending I/O operations subject to one or more token bucket criteria. In addition, to prevent any of the storage controllers from exhibiting a capture effect, each storage controller may distribute new tokens randomly among logical volumes that the storage controller supports.

In at least one embodiment, the determination of local target I/O rates includes measuring or otherwise obtaining recent or current measurements of actual latency and actual I/O rates associated with the particular I/O stream. A current queue depth may be calculated from the values of actual latency and actual I/O rates. The local target I/O rate may then be calculated by dividing the current queue depth by the target latency.

The I/O rates may be expressed in terms of bytes, e.g., MBPS, or I/O throughput, e.g., IOPS. For I/O rates expressed in terms of bytes, each token may represent a byte and the token bucket criteria may include a minimum token criterion requiring a token bucket count exceeding a particular byte count, e.g., a byte count associated with a typical or particular I/O operation. Alternatively, I/O rates may be expressed in terms of I/O operation throughput wherein a token may correspond to a typical or particular I/O operation and wherein the one or more criteria include a minimum token criterion requiring a token bucket count greater than zero (0) or another value.

In accordance with other embodiments of disclosed subject matter, an information handling system comprising a host processing system and a storage subsystem that includes two or more storage controllers includes an I/O management module configured to calculate and impose controller-specific I/O rates on a group of storage controllers associated with a particular I/O stream. The controller-specific I/O rates are determined based on measured values of I/O traffic and latency to reflect current or recent I/O traffic patterns. The measured values are updated from time to time, whether periodically or otherwise, to reflect changes in I/O traffic patterns. The combination of controller-specific I/O rates results in a latency for the I/O stream as-a-whole that equals or closely approximates the desired latency for the I/O stream.

Technical advantages of the present disclosure may be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network data storage device, or any other suitable device and may vary in size, shape, performance, functionality, and price. The information handling system may include memory, one or more processing resources such as a central processing unit (CPU) or hardware or software control logic. Additional components of the information handling system may include one or more data storage devices, one or more communications ports for communicating with external devices as well as various input and output (I/O) devices, such as a keyboard, a mouse, and a video display. The information handling system may also include one or more buses operable to transmit communication between the various hardware components.

In this disclosure, the term "information handling resource" may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

Figure 1:
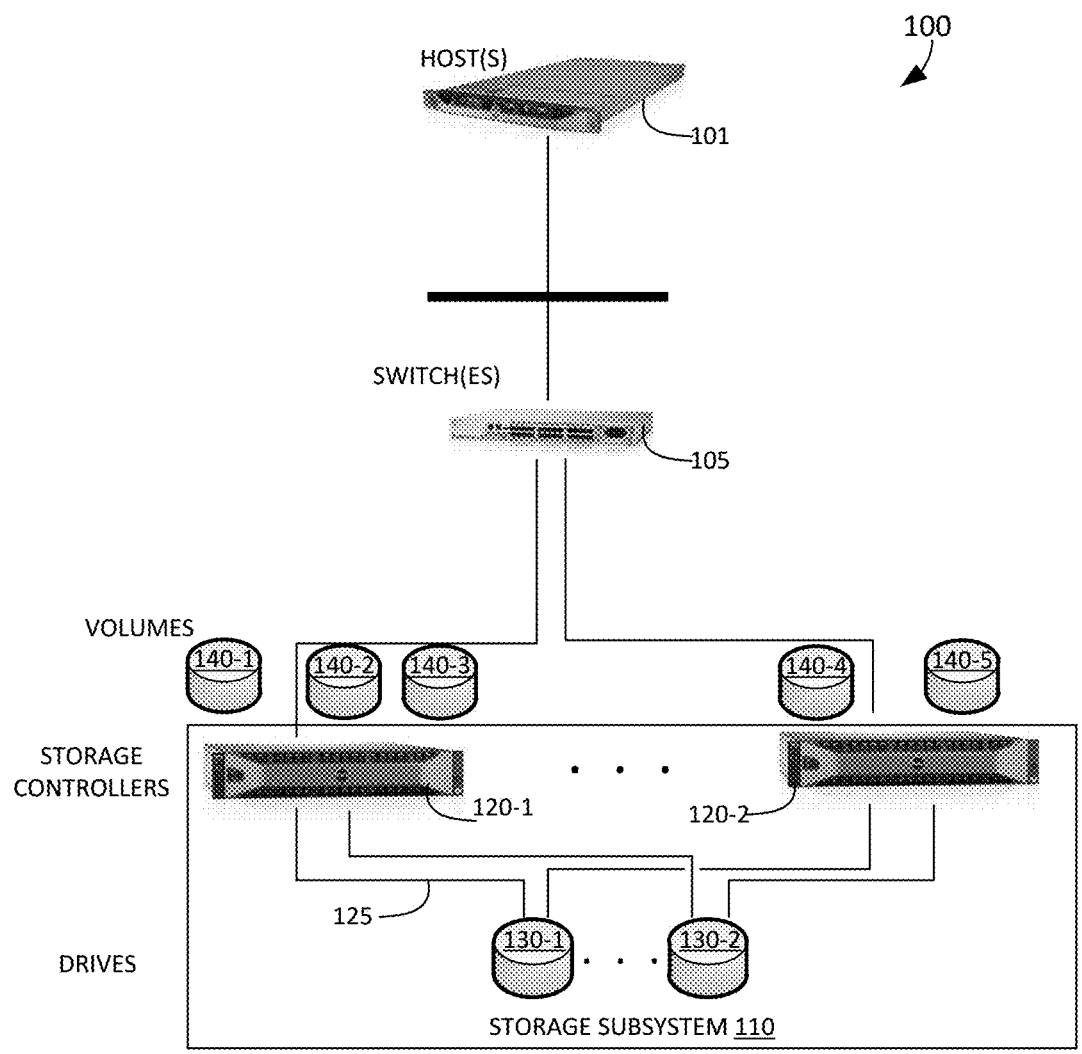
FIG. 1 illustrates a block diagram of an information handling system including support for enforcing a desired latency for an I/O stream that encompasses I/O operations handled by two or more storage controllers.

FIG. 1 illustrates an information handling system 100 configured to manage I/O operations between a host processing resource 101, referred to herein simply as host 101, and a storage subsystem 110 that includes two or more storage controllers 120. Information handling system 100 implements or supports quality of service (QoS) policies, guarantees, or restrictions that may impose upper limits on rates at which the storage subsystem processes I/O operations from the host system.

In at least one embodiment in which host 101 is coupled to a multi-controller storage subsystem 110, information handling system 100 may be configured to monitor, support, or enforce a QoS limit with respect to an I/O stream that includes I/O operations distributed across two or more of the storage controllers. For purposes of this disclosure, an I/O stream may refer to a set or sequence of I/O operations that share one or more attributes or characteristics in common. As non-limiting examples, an I/O stream may refer to I/O operations generated by a particular application or process, I/O operations addressing a particular logical volume or a particular group of logical volumes comprising two or more user-designated logical volumes, I/O operation associated with a particular class of service or a particular priority level, and so forth.

The information handling system 100 illustrated in FIG. 1 includes host 101 coupled to a storage subsystem 110 that includes a plurality of storage controllers 120. Storage controllers 120 are coupled to a plurality of physical storage resources 130 through a storage interconnect 125. Although FIG. 1 illustrates two storage controllers, first storage controller 120-1 and second storage controller 120-2, within storage subsystem 110, storage subsystem 110 may include more storage controllers. Each physical storage resource 130 may include one or more hard disk drives, one or more solid state drives, including one or more flash drives, or any combination thereof.

FIG. 1 illustrates storage controllers 120-1 and 120-2 both coupled to the same physical storage resources 130-1 through 130-2. In other embodiments, first storage controller 120-1 may have access to one or more storage resources that second storage controller 120-2 does not have access to. Similarly, second storage controller 120-2 may, in some embodiments, have access to a storage resource 130 that first storage controller 120-1 does not access to.

Each storage controller 120 illustrated in FIG. 1 exposes one or more logical storage resources, referred to herein as logical volumes 140, to host 101. FIG. 1 illustrates first storage controller 120-1 exposing logical volumes 140-1, 140-2, and 140-3 to host 101 and second storage controller 120-2 exposing logical volumes 140-4 and 140-5 to host 101. In at least one embodiment, the storage controllers 120 may maintain distinct QoS parameter per logical volume 140. For example, storage controller 120-1 may associate a first QoS, QOS1, to logical volume 140-1, a second QoS, QOS2, to logical volume 140-2, and a third QoS, QOS3, to logical volume 140-3.

Figure 2:
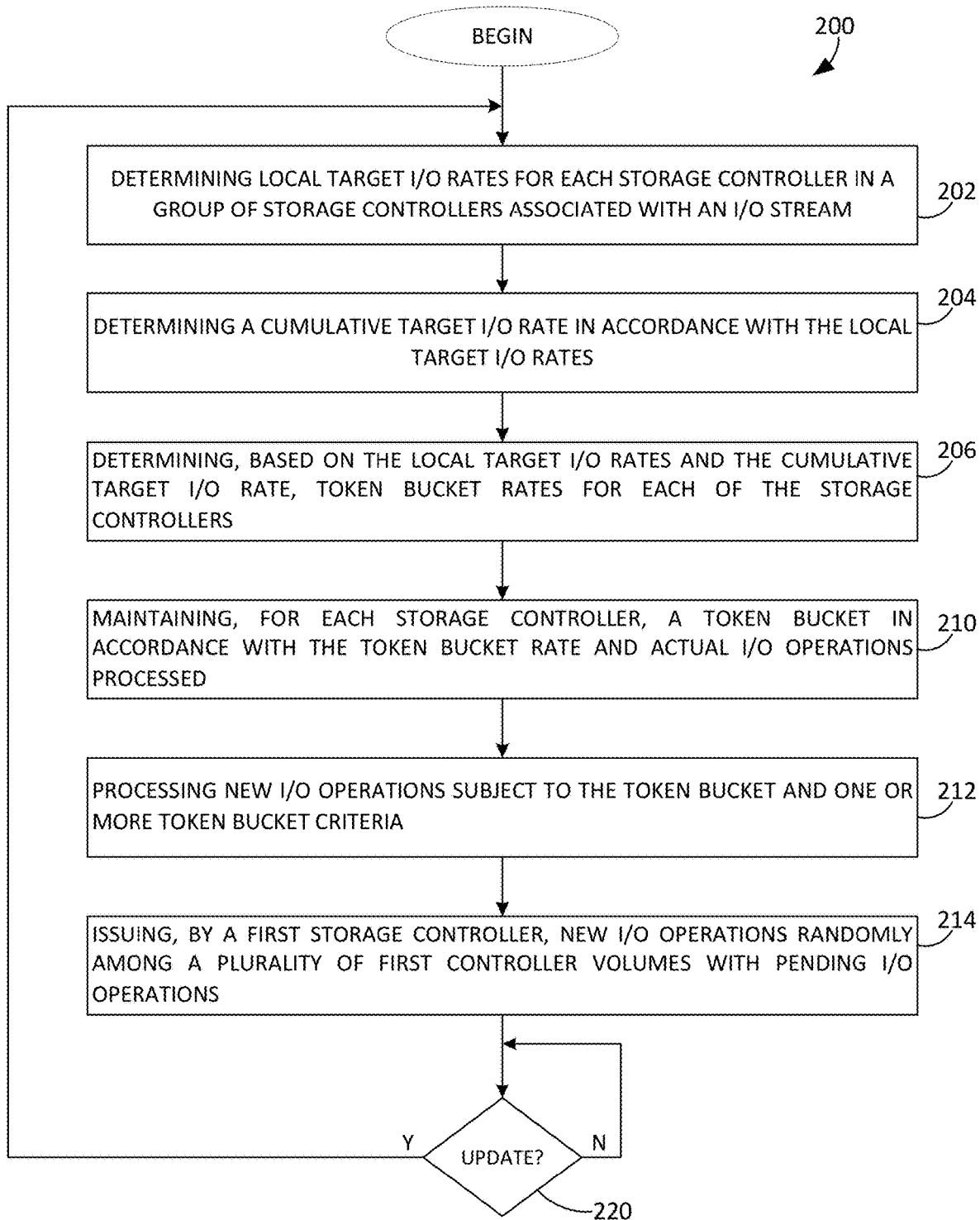
FIG. 2 illustrates a flow diagram of an I/O management method.

FIG. 2 illustrates a block diagram of a method 200 for managing I/O operations between a host and a multi-controller storage subsystem to achieve or enforce a desired latency for an I/O stream that is distributed across two or more of the storage controllers. The desired latency may correspond to a latency specified for a particular QoS to which the I/O stream is subscribed or otherwise associated. Method 200 includes operations that may be performed by host 101 (FIG. 1) as well as operations that may be performed by the individual storage controllers 120 (FIG. 1).

Figure 3:
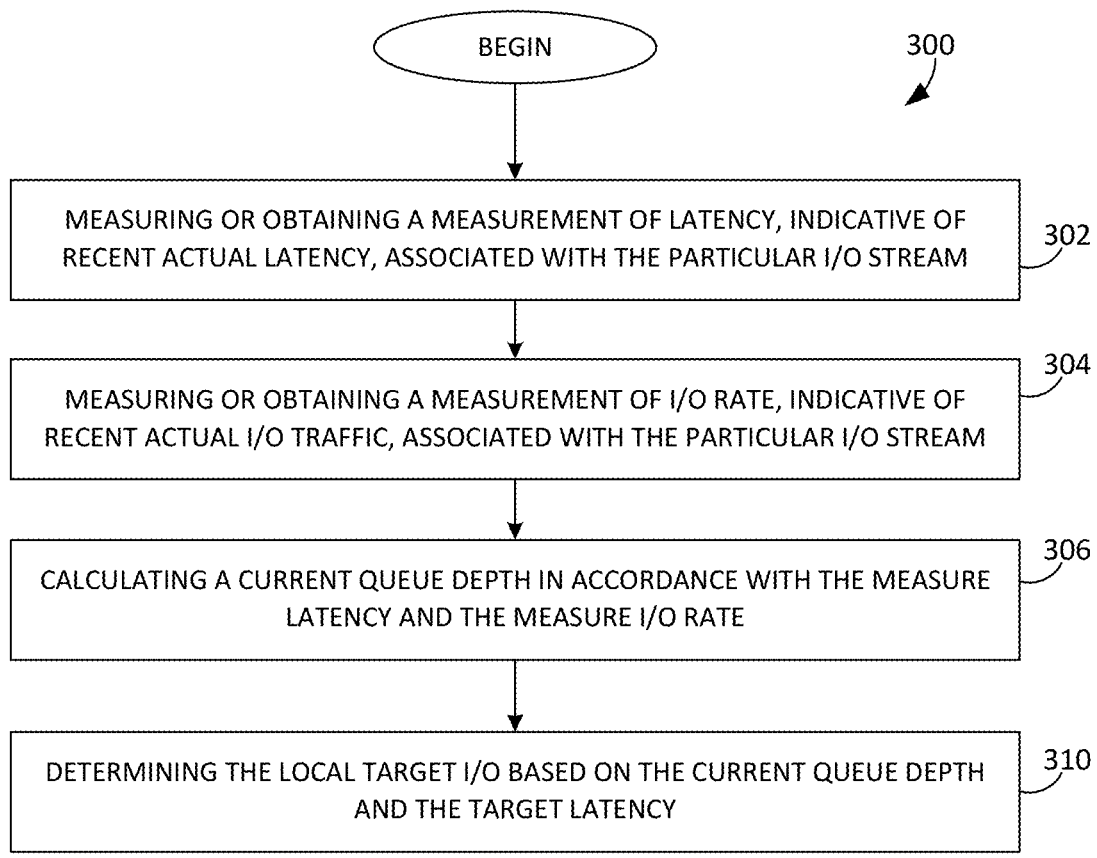
FIG. 3 illustrates a flow diagram of a method of determining local target I/O rates.

The method 200 illustrated in FIG. 2 begins by determining (operation 202) local target I/O rates for each storage controller in a group of storage controllers associated with an I/O stream. The local target I/O rates are controller-specific I/O rates that may reflect current or recent I/O traffic patterns. An example method for performing the local target I/O rate determination of operation 202F is illustrated in FIG. 3 and described in more detail below.

The method 200 illustrated in FIG. 2 further includes determining (operation 204) a cumulative target I/O rate based on or otherwise in accordance with the local target I/O rates determined in operation 202. The cumulative target I/O rate may be calculated as a weighted or unweighted sum of the local target I/O rates or as some other linear or non-linear function of the weighted or unweighted local I/O rates.

Method 200 further includes determining (operation 206) token bucket rates for each of the applicable storage controllers, i.e., each of the storage controllers across which the I/O stream of interest is distributed. The token bucket rates determined in operation 206 may be determined based on a combination of the local target I/O rates determined in operation 202 as well as the cumulative target I/O rate determined in operation 204. In at least one embodiment, the token bucket rates may reflect a pro rata distribution of the cumulative target I/O rate. In such embodiments, a token bucket rate for a first storage controller in the storage controller group is calculated as the weighted or unweighted product of the cumulative target I/O rate and a local-to-cumulative ratio, where the local-to-cumulative ratio is simply the first target I/O rate divided by the cumulative target I/O rate.

Following the determination of token bucket rates in operation 206, the method 200 illustrated in FIG. 2 includes operations for maintaining a token bucket associated with each storage controller. These operations, including the operations 210 through 214 illustrated in FIG. 2, may be performed by each storage controller individually. In other embodiments, operations 210 through 214 may be performed by host processing system 101 (FIG. 1) operating as a centralized manager for the individual storage controllers 120. In still other operations, one or more of the token bucket algorithm operations 210 through 214 may be performed by a remote manager, whether using a management controller (not depicted in FIG. 1) as an intermediary.

The token bucket algorithm operations illustrated in FIG. 2 include maintaining(operation 210) a token bucket for each storage controller associated with the I/O stream of interest. In some embodiments, the token bucket may represent a token bucket counter that is maintained in accordance with the token bucket rate and I/O operations processed by the corresponding storage controller. In these embodiments, a new quantity of one or more tokens is issued periodically at the token bucket rate and existing tokens are removed from the bucket when a pending I/O operation is executed.

In the method 200 illustrated in FIG. 2, processing (operation 212) of pending operations is subject to the token bucket and one or more token bucket criteria. Generally, token bucket algorithms suspend processing of new operations when the token bucket is empty, nearly empty, or otherwise lacks sufficient tokens to "cover" the next one or more pending I/O operations.

When a storage controller exposes a single logical volume to the host processing system, the token bucket algorithm may require just a single token bucket counter. However, when one or more of the storage controllers exposes two or more logical volumes to the host processing system, the token bucket algorithm may require additional counters. In addition, the storage controller may be required to implement a token issuance policy to achieve one or more I/O management objectives.

In some embodiments, storage controllers that expose a plurality of logical volumes may implement a token policy of issuing (operation 214) each new token to a particular logical volume. To prevent a capture effect, in which logical volumes associated with recently processed transactions are more likely to obtain the next available token, one or more individual storage controllers 120 (FIG. 1) may implement a weighted or unweighted random selection process to select the logical volume to which the applicable storage controller will issue the next token. By configuring individual storage controllers to distribute I/O tokens randomly to their respective logical volumes, each of the storage controller's logical volumes may have a roughly equal or proportional likelihood of having a pending I/O operation executed.

The method 200 of FIG. 2 repeats the previously described set of operations from time to time, whether periodically or otherwise. Method 200 may determine (operation 220) whether an update to the target bucket rates is requested or required. Updates may be required or desirable to respond to changes in traffic patterns that the information handling system may be experiencing. The determination operation 220 may result in a branch back to operation 202 in response to detecting an update request or update condition, which may corresponds to the expiration of a particular time interval, an occurrence of a particular event, or satisfaction of a particular criterion. If no condition warranting the branch back to operation 202 is detected in operation 220, the method 200 illustrated in FIG. 2 simply loops on operation 220 until an update condition is detected.

Referring now to FIG. 3, a flow diagram illustrates an example method 300 that may be employed within the operation 202, illustrated in FIG. 2, for determining local I/O rates. The method 300 illustrated in FIG. 3 includes measuring (operation 302) or obtaining a measurement of latency indicative of recent actual latency exhibited by the storage controller with respect to the applicable I/O stream. Latency measurements may be obtained from one or more dedicated or general purpose performance monitors or counters implemented either within a storage controller 120 or within host processing system 101. Some embodiments may include a performance monitor specifically configured to monitor I/O processing latency while other embodiments may implement one or more general purpose performance monitors configured in conjunction with suitable software or firmware, to derive a measurement or estimate of latency from a group of one or more known parameters.

The method 300 illustrated in FIG. 3 further include measuring (operation 304) or obtaining a measurement of I/O traffic that is indicative of recent actual traffic processed by the storage controller with respect to the applicable I/O stream. I/O traffic measurements, like latency measurements, may be obtained with one or more dedicated or general purpose performance monitors or counters implemented either within a storage controller 120 or within host processing system 101. The measurements taken or obtained in operations 302 and 304 may be based on latency and I/O traffic data that is recent, where recent may be defined in terms of minutes, seconds, milliseconds, and so forth, e.g., the most recent 10 seconds of time.

The method 300 illustrated in FIG. 3 further includes calculating (operation 306) a current queue depth (Qd) in accordance with the measured latency and the measured I/O rate. The current queue depth Qd may be calculated as the product of the measured I/O rate and the measured latency. To illustrate the Qd calculation with an example, I/O rate and latency are measured during a recent interval, where the recent interval comprises, as an example, the most recent 30 seconds of time. If 120K I/O operations were processed during the interval, the calculated I/O rate would be 4K IOPS. If the average measured value of latency during the 30 second interval were 1 millisecond, i.e., 0.001 seconds per I/O operation, the calculated value for the current queue depth Qd would be 4.

The method 300 may still further include determining (operation 310) the local target I/O rate based on the current queue depth and the target latency. The target latency may represent the latency associated with a QoS attribute to which the operation stream is subscribed or otherwise associated. Thus, method 300 calculates queue depth Qd based on actual traffic and latency and then uses the calculated value of Qd, together with the desired latency, to determine the target I/O rate. Continuing with the preceding example, if the I/O stream is subscribed to a service with a QoS specifying an average latency of 0.5 milliseconds/operation, the target I/O rate for this storage controller and I/O stream would be (4)/(0.0005 sec/op)=8K IOPS.

Figure 4:
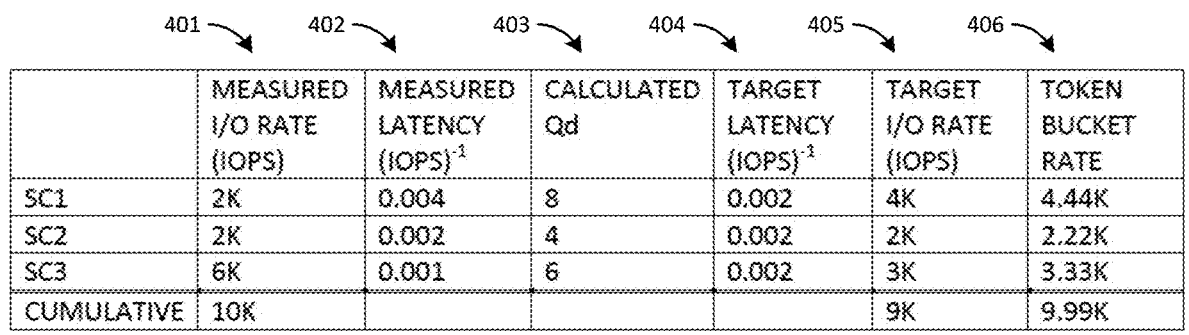
FIG. 4 illustrates an example table indicating the determination of local target I/O rates from measured values of latency and I/O traffic and a target latency associated with a QoS attribute.

Referring now to FIG. 4, a table 400 illustrates target I/O rates calculated for an example in which an I/O stream is distributed across three storage controllers, SC1, SC2, and SC3. Table 400 illustrates measured I/O rates in column 401, measured latency in column 402, and a calculated queue depth (Qd) in column 403. The calculated queue depth (Qd) is then used in conjunction with the target latency (column 404), i.e., the latency associated with the QoS applicable to the I/O stream, to obtain the local target I/O rates indicated in column 405.

From the local target I/O rates in column 405, corresponding target bucket rates (column 406) may be determined. Each token bucket rate may vary directly with a corresponding target I/O rate. In the example illustrated in FIG. 4, the target I/O rates in column 405 are expressed in terms of IOPS. If the token bucket algorithm equates tokens to bytes, the target bucket rate can determined by multiplying the target I/O rate by a conversion factor N where the value of N corresponds to the byte size average of the applicable I/O operations. If the token bucket rate is so high that maintaining the token bucket becomes burdensome or impracticable, a larger token size may be used. For example, increasing the size associated with a token from 1 Byte to 1 Kbyte reduces the target token bucket rate by a factor of 1000.

FIG. 4 illustrates an example in which a first storage controller, SC1, exhibits actual latency higher than the desired latency, a second controller, SC2, exhibits actual latency equal to the desired latency, and a third storage controller, SC3, exhibits actual latency lower than the desired latency. In this case, FIG. 4 illustrates a target I/O rate for SC1 that is higher than its actual I/O rate, a target I/O rate for SC2 that is equal to its actual I/O rate, and a target I/O rates for SC3 that is lower than its actual I/O rate. Qualitatively, FIG. 4 thus illustrates an I/O management approach in which over-performing storage controllers (e.g., SC3) are throttled down and under-performing storage controllers, e.g., SC1, are stepped up to achieve a desired overall latency.

In the example illustrated in FIG. 4, the cumulative target I/O rate is 9K TOPS whereas the cumulative actual I/O rate was 10K IOPS. Some embodiments may adjust the token bucket rates relative to the target I/O rates based on the ratio of actual traffic to traffic associated with the target I/O rates. In the example of FIG. 4, the token bucket rates of column 406 have been adjusted by a factor of 10/9 to reflect the 10:9 ratio of actual cumulative traffic (10K IOPS) to cumulative target traffic (9K IOPS) to align the target I/O rates with the actual volume of traffic. Other embodiments, may apply the token bucket rate indicated in Column 405 without adjustment.

Although the present disclosure has been described in detail, it should be understood that various changes, substitutions, and alterations can be made hereto without departing from the spirit and the scope of the disclosure as defined by the appended claims.

What is claimed is:

1. A method of managing I/O in an information handling system, the method comprising:
   determining local target I/O rates for a particular I/O stream in accordance with a target latency for the particular I/O stream, wherein the local target I/O rates include a local target I/O rate for each storage controller in a plurality of storage controllers associated with the particular I/O stream, and wherein the determining of the local target I/O rates includes, for each storage controller in the plurality of storage controllers:
      obtaining a measured latency, wherein the measured latency is indicative of recent actual latency associated with the particular I/O stream and the storage controller;
      obtaining a measured I/O rate associated with the particular I/O stream and the storage controller;
      calculating a current queue depth in accordance with the measured latency and the measured I/O rate; and
      determining the local target I/O rate based on the current queue depth and the target latency;
   determining a cumulative measured I/O rate from the measured I/O rates and a cumulative target I/O rate from the local target I/O rates;
   based on the local target I/O rates, the cumulative measure I/O rate, and the cumulative target I/O rate, calculating token bucket rates including a token bucket rate corresponding to each storage controller; and
   configuring each storage controller to:
      maintain a token bucket in accordance with the corresponding token bucket rate;
      perform pending I/O operations of the particular I/O stream subject to one or more token bucket criteria;
      responsive to detecting two or more logical volumes with pending I/O operations from the particular I/O stream, randomly identifying one of the two or more logical volumes as a selected volume; and
      issue a next token to the selected volume, wherein tokens correspond to I/O operations and wherein the one or more criteria include a minimum token criteria requiring a positive token bucket.

2. The method of claim 1, wherein the particular I/O stream comprises an I/O stream associated with a particular class of service.

3. The method of claim 1, wherein the particular I/O stream comprises I/O operations associated with a particular host process.

4. The method of claim 1, wherein the particular I/O stream comprises I/O operations addressing a particular logical volume.

5. The method of claim 1, wherein the particular I/O stream comprises I/O operations addressing a particular logical volume group comprising a user-designated group of two or more logical volumes.

6. The method of claim 1, wherein determining the cumulative target I/O rate comprises summing the local target I/O rates.

7. The method of claim 6, wherein calculating a local token bucket rate comprises multiplying a the local target I/O rate by a ratio of a cumulative actual I/O rate to the cumulative target I/O rate.

8. An information handling system, comprising:
a processor;
a non-transient computer readable medium including processor executable I/O management instructions that, when executed by the processor, cause the system to perform I/O management operations comprising:
determining local target I/O rates for a particular I/O stream in accordance with a target latency for the particular I/O stream, wherein the local target I/O rates include a local target I/O rate for each storage controller in a plurality of storage controllers associated with the particular I/O stream, and wherein the determining of the local target I/O rates includes, for each storage controller in the plurality of storage controllers:
obtaining a measured latency, wherein the measured latency is indicative of recent actual latency associated with the particular I/O stream and the storage controller;
obtaining a measured I/O rate associated with the particular I/O stream and the storage controller;
calculating a current queue depth in accordance with the measured latency and the measured I/O rate; and
determining the local target I/O rate based on the current queue depth and the target latency;
determining a cumulative target I/O rate from the local target I/O rates;
based on the local target I/O rates and the cumulative target I/O rate, calculating token bucket rates including a token bucket rate corresponding to each storage controller; and
configuring each storage controller to:
maintain a token bucket in accordance with the corresponding token bucket rate;
perform pending I/O operations of the particular I/O stream subject to one or more token bucket criteria;
responsive to detecting pending I/O operations of the particular I/O stream associated with two or more logical volumes, randomly identifying one of the two or more logical volumes as a current volume; and
issue a next token to the current volume, wherein tokens correspond to I/O operations and wherein the one or more criteria include a minimum token criteria requiring a positive token bucket.

9. The information handling system of claim 8, wherein the particular I/O stream comprises an I/O stream associated with a particular class of service.

10. The information handling system of claim 8, wherein the particular I/O stream comprises I/O operations associated with a particular host process.

11. The information handling system of claim 8, wherein the particular I/O stream comprises I/O operations addressing a particular logical volume.

12. The information handling system of claim 8, wherein the particular I/O stream comprises I/O operations addressing a particular logical volume group comprising a user-designated group of two or more logical volumes.

13. The information handling system of claim 8, wherein determining the cumulative target I/O rate comprises summing the local target I/O rates.

14. The information handling system of claim 8, wherein calculating a local token bucket rate comprises multiplying a the local target I/O rate by a ratio of a cumulative actual I/O rate to the cumulative target I/O rate.

* * * * *